(12) United States Patent
DeLeeuw

(10) Patent No.: US 6,642,629 B2
(45) Date of Patent: Nov. 4, 2003

(54) AUDIO SYSTEM WITH REMOVABLE, ACTIVE FACEPLATE

(75) Inventor: William C. DeLeeuw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 09/752,977

(22) Filed: Dec. 28, 2000

(65) Prior Publication Data

US 2002/0084700 A1 Jul. 4, 2002

(51) Int. Cl.[7] ............................................... B60R 16/00
(52) U.S. Cl. ...................................................... 307/10.1
(58) Field of Search ........................... 307/140, 10.1; 701/36; 455/3.06

(56) References Cited

U.S. PATENT DOCUMENTS

| | | | | |
|---|---|---|---|---|
| 5,537,673 A | * | 7/1996 | Nagashima et al. | 455/346 |
| 5,554,966 A | * | 9/1996 | Iijima et al. | 307/10.2 |
| 5,637,928 A | * | 6/1997 | Nakajima et al. | 307/10.2 |
| 5,705,975 A | * | 1/1998 | Serino et al. | 307/10.2 |
| 5,705,976 A | * | 1/1998 | Howard | 307/10.2 |
| 5,706,353 A | * | 1/1998 | Arai et al. | 381/77 |
| 5,794,164 A | * | 8/1998 | Beckert et al. | 701/36 |
| 5,880,673 A | * | 3/1999 | Howard | 307/10.2 |
| 6,131,051 A | * | 10/2000 | Beckert et al. | 307/10.1 |
| 6,144,114 A | * | 11/2000 | Chutorash | 307/10.5 |
| 6,201,540 B1 | * | 3/2001 | Gallup et al. | 345/764 |
| 6,427,115 B1 | * | 7/2002 | Sekiyama | 701/36 |
| 6,483,428 B1 | * | 11/2002 | Fish et al. | 340/425.5 |
| 6,563,421 B1 | * | 5/2003 | Wheeler | 307/10.1 |

FOREIGN PATENT DOCUMENTS

EP          286600 A2 * 10/1988 ............ H04B/1/08

* cited by examiner

Primary Examiner—Gregory J. Toatley, Jr.
Assistant Examiner—Roberto J. Rios
(74) Attorney, Agent, or Firm—Marger Johnson & McCollom, PC

(57) ABSTRACT

An audio system with a removable faceplate. The system may include a base unit including at least one source of audio input and at least one speaker operable to provide audio output. In addition the system may include a removable faceplate that is an active device, and a connector allowing connection between the removable faceplate to the base unit. The faceplate may include an internal power source to provide power to the faceplate when removed from the base unit, a memory for storing data representative of audio signals, and a connector allowing connection to an output device.

18 Claims, 2 Drawing Sheets

AUDIO SYSTEM WITH REMOVABLE, ACTIVE FACEPLATE

BACKGROUND

1. Field

This disclosure relates to audio systems with removable faceplates, more particularly to an audio system with a removable faceplate that is an active device.

2. Background

Vehicle audio systems are often targets of theft. They are relatively small and designed to be removable from dashboards of cars, boats and other vehicles. Yet, they can be relatively expensive systems, as audio technology has evolved. Several methods of securing these devices have developed to allow users to leave vehicles unattended and still secure their systems from theft.

One approach allows the user to remove the front panel, or faceplate, of the audio system control module. Typically, the user presses a small button on one side that disconnects the faceplate from the base unit. Disconnection of the faceplate renders the base system inactive. The connections may be mechanical, electrical, electronic or a combination of all three. When the connection is broken, the base system no longer functions, making the system a less likely target of theft.

However, the user is now burdened with the faceplate. These faceplates are usually relatively small in size, but useless without the base system. With the exponential growth of personal electronic devices, however, carrying an inoperative faceplate in addition to useful electronic devices is burdensome to the user. It would seem desirable to have the faceplate take the place of one or more of the other personal electronic devices a user may carry, reducing the number of devices carried.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
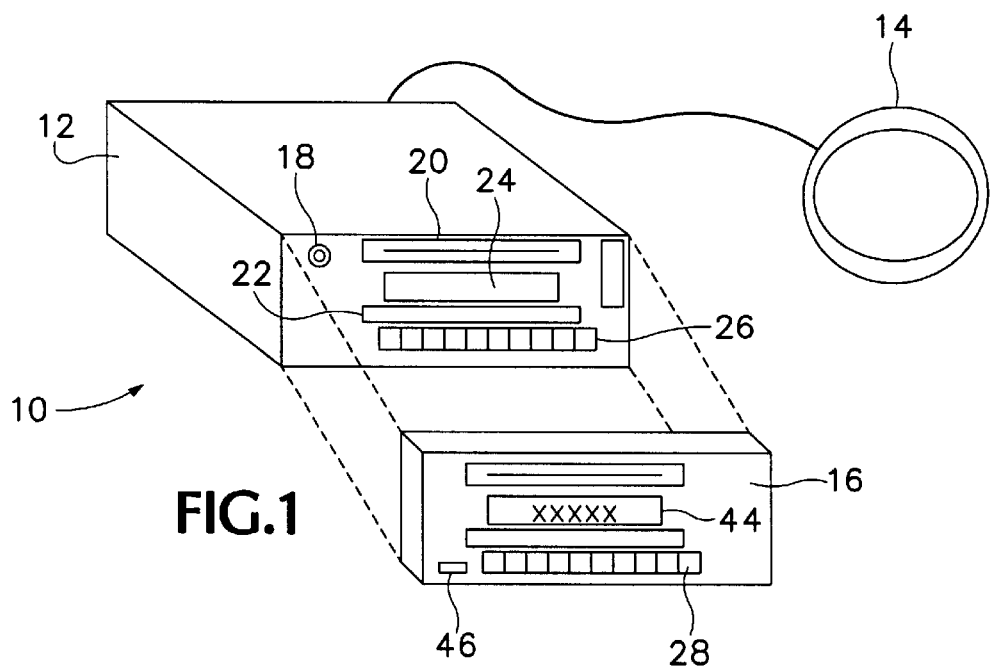
FIG. 1 shows one embodiment of a base audio system with a removable faceplate, in accordance with the invention.

FIG. 1 shows one embodiment of an audio system 10. The audio system 10 has a base unit 12, connected to at least one speaker 14 operable to provide audio output. A removable faceplate 16 connects to the base audio system 12 through a connector 18. In this particular example, the connector 18 resides on the base audio system 12. However, the connector could reside on the removable faceplate 16. For ease of use of the removable faceplate 16, the connector 18 may reside on the base unit to avoid any unnecessary protrusions on the faceplate 16. Since the user will more than likely be carrying the faceplate, any protrusions may be inconvenient and uncomfortable.

When the faceplate 16 is connected to the base system 12, the base system operates as an audio system, such as a car stereo. The base system may have as possible audio inputs a compact disc player 20, a cassette player 22, and/or a tuner 24. The faceplate will have access ports to these input devices. In addition, control buttons 28 on the faceplate may have corresponding contacts 26 that allow the user to control the audio system. Display panel 44 may provide a user interface allowing the user to receive information about the various possibilities for input and system parameters controlled by the control inputs 28. The control inputs 28 may be buttons or knobs, or may be part of the display, using a touch screen and stylus, for example.

Figure 2:
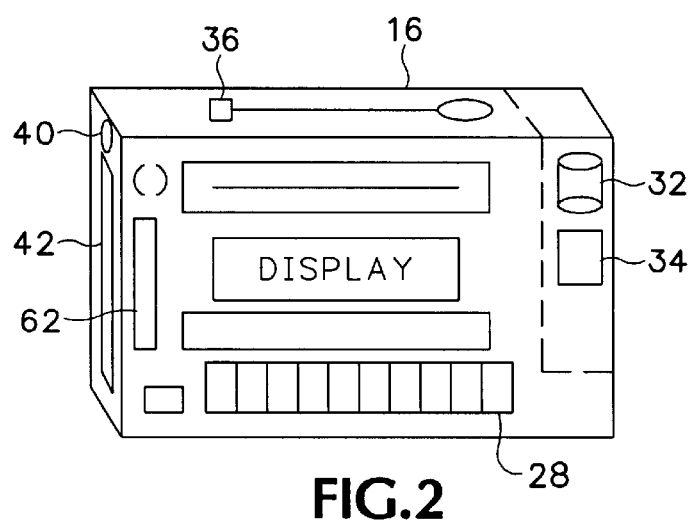
FIG. 2 shows one embodiment of an active removable faceplate capable of being connected to a base audio system.

Removal of the faceplate 16 renders the base system 12 inoperable. This is a security feature available in vehicular stereo systems, as an example. Typically the user presses a button, such as a button 46, that releases the faceplate from the base audio unit. However, once removed from the base audio system, the faceplate may be an active electronic device. A more detailed example of the faceplate 16 is shown in FIG. 2.

The faceplate 16 is capable of operating as an active device when separated from the base audio system. A power source, such as batteries, 32 may provide power to the unit. In one example the power source is rechargeable batteries that may be recharged upon being reconnected to the base audio system. The faceplate will have a memory 34 operable to store signals representative of audio signals.

Figure 3:
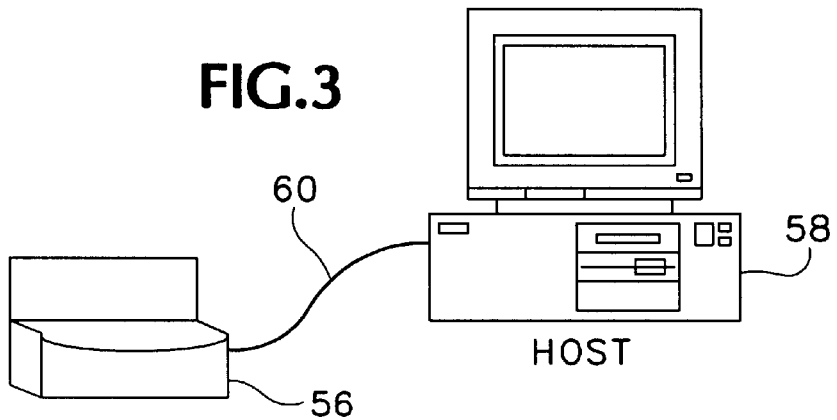
FIG. 3 shows one embodiment of a cradle operable to allow an active removable faceplate to connect to a host.
Figure 4:
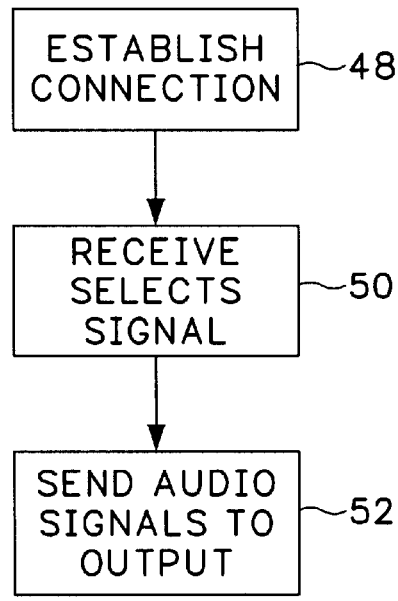
FIG. 4 shows one embodiment of a method for establishing communication between a faceplate and a base audio system, in accordance with the invention.

One example of the faceplate as an active electronic device is when it functions as an MP3 (Moving Pictures Expert Group, Layer 3) player or any other digital audio format player. The user may download songs through a connector 42 that allows the player to be connected to a host source of songs, such as a personal computer, other computing device, or network connection. In one example, the user may set the faceplate into a cradle attached to a personal computer and connect through the connector 42 to the personal computer. This is shown in FIG. 3. The cradle 56 is attached via a cable or other connection 60 to a host 58. In this example, the host is a personal computer. However, the cradle may have a phone jack or other method to access a connection to a network. In that example, the network would be the host.

Referring back to FIG. 2, the songs are then downloaded into the memory 34 for play by the faceplate acting as a player. The same connector that provides connection to the personal computer may be used to provide connection to the base audio system and may serve to recharge the batteries, either when connected to the base audio system or the host. Alternatively, the faceplate may just have a port 42 operable to connect to the base audio system or the cradle or other connection device.

The connector 18 may be a digital connector, such as mentioned above, or an analog connector, such as a simple audio jack. In addition, the connection may be a combination of the two, with a digital interface providing control signals, and the analog connection providing the analog audio signals for the speakers.

Using the connector between the faceplate and the base audio system, the base audio system may function as a music store and library. For example, the base audio system may receive the downloaded music files from the faceplate. The base audio system may use the user interface from the faceplate to allow the user to transfer files between the two components. In this manner, the user may build a music library on the base audio system and can transfer songs between the two components to be played on either the base system or the faceplate when functioning as a digital music player, such as an MP3 player.

The faceplate may have some alternative audio output, such as an earphone jack 36. The earphone jack 36 may also be used with minispeakers. In order to increase the usability of the faceplate, ear buds or other types of earphones 38 may be attached to the faceplate such as in a recess on the faceplate. In this manner, the faceplate will provide higher ease of use to the user.

Another example of the faceplate as an active device may be as a personal voice recorder used to record short memos for the user. In this example, a microphone 40 will be included on the faceplate, allowing the user to make recordings. The recordings would be stored in the memory 34. One such type of recording the user may want to make is directions. Such directions may be downloaded from a source, such as a personal computer or network such as the Internet, in addition to being recorded by the user. When the user reconnects the faceplate to the base audio system in the car, the directions would then be playable through the car speakers to the user, providing guidance to the desired destination.

Several other examples of active electronic devices that the faceplate may become include a cellular telephone, a pager, or a digital radio with a tuner separate from the audio system. In the case of a cellular telephone or a pager, the connector 42 may be a wireless connection, such as an antenna to allow reception of the cellular phone or paging signals.

The faceplate functioning as a radio with its own tuner would have the connector 42 as an antenna, as well. In addition, the faceplate would require a tuner 62 to provide the faceplate with playable signals. This combination of functions may provide a new capability to the user. If the user is listening to the faceplate/music player/radio and hears an advertisement or a song that the user likes, the user may press or otherwise access one of the control inputs to store data with regard to that particular broadcast. For example, the faceplate may store the radio station, the time and date. When the user connects the faceplate to the host or base audio system, the host or base audio system may then access a master program guide or a web page for that particular station. Using the date and time, the user can then access the specifics of the particular song or advertisement for further information. These capabilities depend on the nature of communication between the faceplate and the base audio system or host.

A method of establishing communication between the faceplate and the base audio system is shown in FIG. 3. At 48, the connection between the faceplate and the base audio system is made. In addition to the connectors discussed above, the base audio system may have a mounting motor that takes control of the faceplate and moves it into position to connect to the base audio system.

Once the connection is established, the user can select which audio input will provide the audio signals to the speaker. Typically, the user will accomplish this through selection by the control buttons 28. The audio input signal may originate from one of the devices resident on the base unit, such as a CD player, a cassette player, or a tuner. Alternatively, the base unit may receive audio signals from the faceplate, such as MP3 songs downloaded into it, or voice recordings. As yet another alternative, the data stored in the memory of the faceplate could be loaded into the memory of the base audio unit and then played through the speaker. As yet another example, the faceplate may decode the memory contents play the analog results through the base audio system 12.

As can be seen from the above discussion, many alternatives exist for the functions and specific components of the faceplate. These are intended only as examples and are not in any way intended to limit the scope of the invention.

Thus, although there has been described to this point a particular embodiment for a method and apparatus for an audio system having a removable, active faceplate, it is not intended that such specific references be considered as limitations upon the scope of this invention except in-so-far as set forth in the following claims.

What is claimed is:

1. An audio system, comprising:
    a base unit including at least one source of audio input;
    at least one speaker operable to provide audio output;
    a removable faceplate, wherein the removable faceplate is an active device when removed from the base unit, the removable face plate having a host connector to allow the faceplate to connect to a host; and
    a base connector operable to connect the removable faceplate to the base unit.

2. The system of claim 1, wherein the source of audio input includes at least one from the group comprised of: a radio tuner, a compact disc player, a cassette player, and a digital music player.

3. The system of claim 1, wherein the faceplate further comprises:
    an internal power source operable to provide power to the faceplate when removed from the base unit;
    a memory operable to store data representative of audio signals; and
    an audio connector operable to allow connection to an output device.

4. The faceplate of claim 3, wherein the faceplate further comprises a display operable to offer a user interface.

5. The faceplate of claim 3, wherein the faceplate further comprises at least one control input.

6. The faceplate of claim 3, wherein the internal power source further comprises rechargeable batteries operable to be recharged when the faceplate is connected to the base unit.

7. The faceplate of claim 3, wherein the internal power source further comprises rechargeable batteries operable to be recharged when the faceplate is connected to a cradle.

8. The faceplate of claim 3, wherein the audio connector operable to allow connection to an output device includes a set of headphones already attached to the connector.

9. The faceplate of claim 3, wherein the faceplate further comprises a microphone operable to receive audio signals.

10. The system of claim 1 wherein the removable faceplate is operable to function as one of the group comprised of: an MP3 player, a personal voice recorder, a personal digital assistant, a cellular phone, a pager and a digital radio.

11. The system of claim 1 wherein the base connector further comprises a digital connector.

12. The system of claim 1 wherein the base connector further comprises an analog connector.

13. A faceplate, comprising:
    a base connector operable to allow the faceplate to be connected to a base system;
    an audio connector operable to allow the faceplate to connect to at least one audio output;
    a host connector operable to allow the faceplate to connect to a host;

a power source operable to provide the faceplate to operate independent of any base system; and a memory operable to store signals representative of audio signals.

14. The faceplate of claim 13, wherein the faceplate further comprises a microphone.

15. The faceplate of claim 13, wherein the faceplate further comprises a display and at least one control input operable to provide a user interface.

16. A method of providing a music library, the method comprising:

connecting a faceplate from a base audio system to a host;

downloading music files from the host system to the faceplate;

reconnecting the faceplate to the base audio system; and transferring files from the faceplate to a music library in the base audio system.

17. The method of claim 16, connecting a faceplate further comprising connecting the faceplate to a cradle in communication with the host, wherein the host is a personal computer.

18. The method of claim 16, connecting a faceplate further comprising connecting the faceplate to a phone jack in communication with the host, wherein the host is a network.

* * * * *